US008431869B2

(12) United States Patent
Raghavan et al.

(10) Patent No.: US 8,431,869 B2
(45) Date of Patent: Apr. 30, 2013

(54) DEFROSTING, DEFOGGING AND DE-ICING STRUCTURES

(75) Inventors: Rajesh Raghavan, Bangalore (IN); Senthil Kumar Vadivelu, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 12/792,725

(22) Filed: Jun. 2, 2010

(65) Prior Publication Data

US 2011/0297661 A1 Dec. 8, 2011

(51) Int. Cl.
*B60L 1/02* (2006.01)

(52) U.S. Cl.
USPC .......................... 219/203; 252/500; 428/422.8

(58) Field of Classification Search .................. 156/106; 136/263; 252/500; 359/512; 428/422.8; 313/504; 219/203
See application file for complete search history.

(56) References Cited

U.S. PATENT DOCUMENTS

| | | | | |
|---|---|---|---|---|
| 4,081,581 | A | | 3/1978 | Littell, Jr. |
| 4,373,130 | A | | 2/1983 | Krasborn et al. |
| 4,634,242 | A | | 1/1987 | Taguchi et al. |
| 4,728,781 | A | | 3/1988 | Donley et al. |
| 4,786,784 | A | | 11/1988 | Nikodem et al. |
| 4,910,380 | A | | 3/1990 | Reiss et al. |
| 5,445,694 | A | * | 8/1995 | Gillner et al. ................. 156/106 |
| 5,474,729 | A | | 12/1995 | Yada |
| 5,751,484 | A | * | 5/1998 | Goodman et al. ............ 359/512 |
| 5,766,739 | A | | 6/1998 | Funaki et al. |
| 5,877,473 | A | | 3/1999 | Koontz |
| 6,031,214 | A | | 2/2000 | Bost et al. |
| 6,137,085 | A | | 10/2000 | Nakashima et al. |
| 6,255,624 | B1 | | 7/2001 | Boaz et al. |
| 6,730,877 | B2 | | 5/2004 | Schmidt |
| 7,004,994 | B2 | | 2/2006 | Hampden-Smith et al. |
| 7,129,444 | B2 | | 10/2006 | Weiss |

(Continued)

FOREIGN PATENT DOCUMENTS

| | | |
|---|---|---|
| DE | 298 08 842 U1 | 9/1998 |
| EP | 0 732 865 A2 | 9/1996 |
| WO | WO 99/60823 | 11/1999 |

OTHER PUBLICATIONS

Yu et al. "Graphite Nanoplatelet—Epoxy Composite Thermal Interface Materials", The Journal of Chemistry Letters C, Published on Web May 10, 2007, pp. 7565-7569.

(Continued)

*Primary Examiner* — Eugene Lee
*Assistant Examiner* — Fang-Xing Jiang
(74) *Attorney, Agent, or Firm* — Dierker & Associates, P.C.

(57) ABSTRACT

Defrosting, defogging, and de-icing structures are disclosed herein. An example of the structure includes at least one optically transparent member, at least one electrical strip extending along the at least one surface of the at least one optically transparent member; and an optically transparent composite established on at least the at least one surface of the at least one optically transparent member. The composite is in thermal communication with the at least one electrical strip. The composite includes a matrix, and a predetermined amount of graphene. The predetermined amount is based upon a predetermined transparency for the structure and a predetermined thermal conductivity of the structure. Furthermore, the structure is configured such that the graphene functions as a thermal conductor for substantially uniform heating of the composite and not an electrical conductor.

15 Claims, 6 Drawing Sheets

U.S. PATENT DOCUMENTS

| | | | | |
|---|---|---|---|---|
| 7,956,528 | B2 * | 6/2011 | Nabeta | 313/504 |
| 2004/0188418 | A1 | 9/2004 | Aisenbrey | |
| 2005/0067406 | A1 | 3/2005 | Rajarajan et al. | |
| 2005/0126338 | A1 | 6/2005 | Yadav | |
| 2006/0011615 | A1 | 1/2006 | Yamada | |
| 2006/0014050 | A1 | 1/2006 | Gueneau et al. | |
| 2006/0096967 | A1 | 5/2006 | Weiss | |
| 2006/0157462 | A1 | 7/2006 | Weiss et al. | |
| 2006/0196865 | A1 | 9/2006 | Weiss | |
| 2007/0148064 | A1 | 6/2007 | Labrousse | |
| 2007/0187381 | A1 | 8/2007 | Vontell, Sr. et al. | |
| 2007/0284557 | A1 * | 12/2007 | Gruner et al. | 252/500 |
| 2008/0028697 | A1 | 2/2008 | Li et al. | |
| 2008/0038458 | A1 | 2/2008 | Gemici et al. | |
| 2008/0152926 | A1 * | 6/2008 | Baikerikar et al. | 428/422.8 |
| 2008/0166563 | A1 | 7/2008 | Brittingham et al. | |
| 2009/0314350 | A1 * | 12/2009 | Jung et al. | 136/263 |

OTHER PUBLICATIONS

Ganguli et al. "Improved Thermal Conductivity for Chemically Functionalized Exfoliated Graphite/Epoxy Composites", Carbon 46 (2008), pp. 806-817.

Watcharotone et al. "Graphene—Silica Composite Thin Films as Transparent Conductors", Nano Letters (2007), vol. 7, No. 7, pp. 1888-1892.

* cited by examiner

DEFROSTING, DEFOGGING AND DE-ICING STRUCTURES

TECHNICAL FIELD

The present disclosure relates generally to defogging, defrosting, and/or de-icing structures.

BACKGROUND

Transparent glass or composite structures are often used for making various automotive and/or aerospace components. Such components include various transparent external parts, examples of which include windshields, mirrors, windows, backlights, headlights, and/or the like. Such transparent structures may, for example, fog up, frost, and/or become icy under certain atmospheric conditions. Such fogging, frosting, and/or icing may, in some instances, deleteriously affect visibility through the structure.

SUMMARY

Defrosting, defogging, and de-icing structures are disclosed herein. An example of the structure includes at least one optically transparent member, at least one electrical strip extending along the at least one surface of the at least one optically transparent member; and an optically transparent composite established on at least the at least one surface of the at least one optically transparent member. The composite is in operative contact with the at least one electrical strip. The composite includes a matrix, and a predetermined amount of graphene. The predetermined amount is based upon a predetermined transparency for the structure and a predetermined thermal conductivity of the structure. Furthermore, the structure is configured such that the graphene functions as a thermal conductor for substantially uniform heating of the composite and not an electrical conductor.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
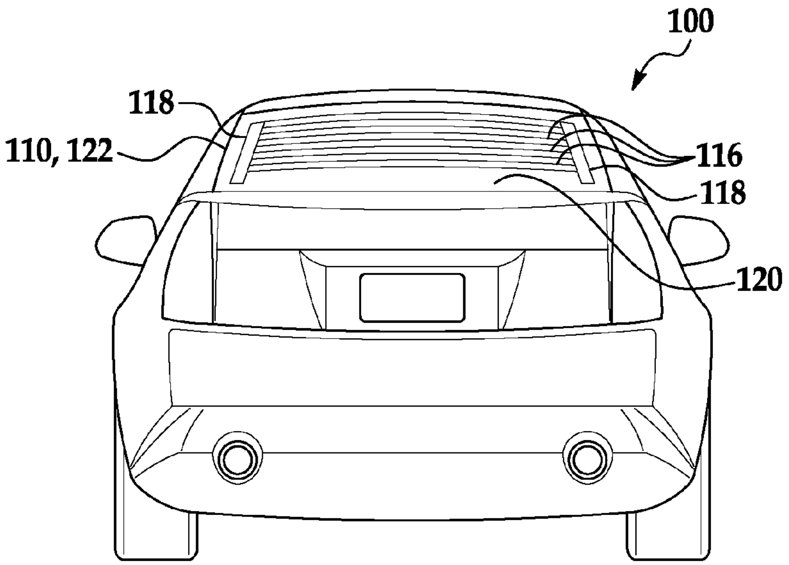
FIG. 1 is a back view of an automobile having an embodiment of the structure as the rear window.

Defrosting, defogging, and/or de-icing structures are widely used in automobiles and other vehicles during inclement weather to increase visibility and/or melt snow, frost, ice, etc. Example(s) of the defogging, defrosting and/or de-icing structure, as disclosed herein, may be used for windshields, windows (including any front, side windows and/or the rear window(s)), headlights, backlights, or other similar automotive and/or aerospace transparent or non-transparent components. In one embodiment, the structure generally includes at least one optically transparent member, and an optically transparent composite coated on at least a portion of the optically transparent member(s). Due, at least in part, to its transparency, the structure of this embodiment is aesthetically pleasing for use as an external part for a mobile vehicle (examples of which include automobiles, trucks, motorcycles, buses, motor homes, planes, helicopters, boats, trains, etc.), as well as any windows that can employ electrical sources such as points or strips which are electrically or otherwise heated for defrosting, de-icing, and/or defogging the surface of the window or other external component. In another embodiment, the structure generally includes at least one opaque member, and a composite coated on at least a portion of the opaque member(s).

The composite, whether used in a transparent embodiment or a non-transparent embodiment, includes a predetermined amount of graphene therein. The incorporation of the graphene into the composite allows the composite to substantially uniformly distribute heat delivered thereto, thereby enabling substantially homogeneous defrosting/defogging/de-icing. This is due, at least in part, to the substantially uniform distribution of the graphene throughout the matrix. The various structures are configured so that the graphene functions as a thermal conductor (as opposed to an electrical conductor), thereby enhancing the thermal conductivity of the resulting structure by at least three orders of magnitude (when compared to structures without such graphene). This enables heating of the structure without the use of Joule heating (i.e., ohmic heating or resistive heating, resulting from the passage of electrical current through a conductor). While electrical strips are used to initiate the heating of the structure disclosed herein, thermal conduction (as opposed to Joule heating) is used to transfer the heat throughout the composite. By thermal conduction, heat is conducted throughout a material based on the physical properties of the material(s) used. Graphene is capable of both electrical conduction and thermal conduction. However, in the embodiments disclosed herein, the graphene is used in an amount or is electrically isolated from a heat source such that the graphene enhances thermal conduction of the composite. This leads to substantially uniform heating of the composite and thus the structure, which in turn efficiently and quickly defogs, defrost, and/or de-ices the structure.

The enhanced thermal conductivity also enables defrosting, defogging, and/or de-icing to take place in a relatively short time frame. The quickness is due, at least in part, to the heating of the entire surface of the structure at substantially the same time, as opposed to other techniques where the structure is gradually heated through, e.g., electrical leads or wires embedded (as a grid) in the structure. The drastic reduction in time is especially advantageous.

Still further, because the composite is included as a coating adjacent to the substrate (i.e., optically transparent or opaque member), the substrate/member itself not need to include conductive materials. This is believed to decrease the manufacturing cost.

Referring now to FIG. 1, an embodiment of a vehicle 100 including an embodiment of the structure 110 is depicted. In this particular non-limiting example, the structure 110 is implemented into the rear window 122 of the vehicle 100. As mentioned hereinabove, the structure 110 may also be implemented in windshields, other windows (including any front and side windows, headlights, backlights, or other similar components.

While shown and discussed in more detail in reference to FIGS. 2 through 6, the structure 110 generally includes an optically transparent or opaque member 112, 132 (shown in FIG. 6), at least one electrical strip 116 established on the member 112, and a composite 114 established on all or a portion of the member 112 such that the composite is in thermal communication with the electrical strip(s) 116.

As shown in FIG. 1, the structure 110 includes a plurality of electrical strips 116 (discussed further hereinbelow in reference to FIGS. 7A, 7B, and 8A through 8D). In this example, each strip 116 is electrically connected to two bus bars 118. An electric current may be generated via any suitable means, for example, using one or more suitable energy sources in, for example, the automobile (or other object) in which the structure 110 is operatively incorporated. In an example, electrical leads or bus bars 118 operatively connect an electrical source (not shown) to the electrical strips 116. The electric current flows to the electrical strips 116, where heat is generated and is thermally conducted through the composite 114, at least in part, via graphene located therein. The heat is transferred to the surrounding polymer matrix of the composite 114 via thermal conduction. The heated structure 110 reduces or removes fog, frost, ice, or other forms of condensation.

Figure 2:
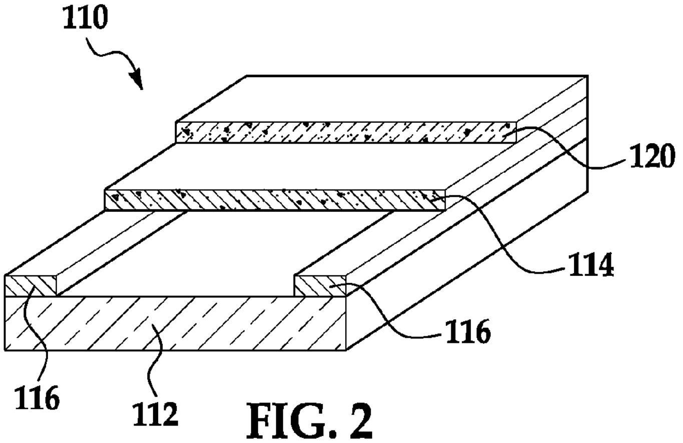
FIG. 2 is a schematic, perspective view of an example of a defrosting, defogging, and/or de-icing structure, having a portion of certain layers removed for clarity.

Referring now to FIG. 2, one example of the structure 110 is depicted. This embodiment includes the optically transparent member 112, which is formed of any suitable optically transparent material. In an example, the optically transparent member 112 is glass. In another example, the optically transparent member 112 is a transparent polymer such as, for example, an epoxy, a polycarbonate, transparent polyesters (such as poly(ethylene terephthalate or poly(butylene terephthalate), poly(acrylonitrile), and/or a poly(methylmethacrylate)-based material. While not typically transparent, in coating format, a polyvinyl butyral, a polyurethane, or polyvinyl chloride may exhibit the desirable transparency for the optically transparent member 112. It is to be understood that transparent polymer may exhibit properties suitable for the end use for which the structure 110 will be used. In instances where the transparent polymer does not exhibit such properties, a predetermined filler and/or additive may be included therein. The predetermined filler and/or the predetermined additive may be selected from materials that will suitably incorporate the desired predetermined property to the transparent polymer. Non-limiting examples of such properties includes strength, scratch resistance, audible noise reduction, transparency, impact resistance, or the like, or combinations thereof. Non-limiting examples of suitable additives include co-monomers (e.g., butyl-acrylates or other monomers including the same base material as the transparent polymer, where such co-monomers improve impact strength of poly (methylmethacrylate)-based systems or, if small amounts of the co-monomer are used, substantially prevent premature depolymerization of the base polymer), dyes (e.g., for color or ultra-violet protection), rubber toughening agents, and non-limiting examples of suitable fillers include ultra-violet blocking materials (such as, e.g., titanium dioxide, zinc oxide, or the like), glass fibers, or combinations thereof. It is to be understood that the use of additives and the amount of additives included may be limited by the desirable transparency of the optically transparent member 112. For example, the amount of titanium oxide, zinc oxide or other fillers suitable for use in the optically transparent member 112 may be small in order to achieve the desired level of transparency.

The optically transparent member 112 may be molded or otherwise manufactured into the desirable part shape. As previously mentioned, the part size and shape may correspond with the size and shape of a window, light, etc. in, for example, a mobile vehicle, a building, or another desirable application. Manufacturing the member 112 is generally accomplished prior to establishing the composite 114 thereon. For example, the optically transparent member 112 is molded or manufactured using one or more conventional processes. In instances where the member 112 is formed from a thermoset material, the member 112 may be formed using compression molding. In such instances, a mold including a desired part shape may be filled with the thermoset material and subsequently cured under compressive forces and heated to cure the material and set the part shape. When the compression molding process is complete, the optically transparent composite 114 is laminated to, or otherwise deposited on, the member 112. In instances where the member 112 is formed from a thermoplastic material, the member 112 may be formed via injection molding, extrusion molding, or the like. In one example, the thermoplastic material may be fed through an injection molding machine at a suitably high temperature (e.g., above a melting temperature of the material). The material is melted and mixed/blended while traveling through the machine. The material may then be injected into a mold having a desired part shape, and subsequently set into that part shape. When the injection molding cycle is complete, the part may be ejected from the mold and laminated with, or otherwise adhered to, the optically transparent composite 114. In still another example, the thermoplastic material may be fed through an extruder, where the material is melted and mixed/blended while traveling therethrough. It is to be understood that the shape of the die at the end of the extruder screw is in the general shape of the targeted part shape (e.g., tubular, sheet form, etc., where the die dimensions account for material expansion/contraction during thermal events). Such extrusion processes may require for the extrudate to be somewhat machined (e.g., filed, cut, etc.) prior to being casted with the optically transparent composite 114.

This embodiment of the structure 110 has two electrical strips 116 established on opposed ends E1, E2 along the periphery of the optically transparent member 112. While not shown in FIG. 2, the electrical strips 116 are configured to be electrically connected to a power source so that such strips 116 may receive electric current.

In this embodiment, the composite 114 is optically transparent, and includes a matrix having graphene established therein. In a non-limiting example, the coated structure 110 includes a substantially continuous film of the composite 114. The thickness of the film generally depends, at least in part, on the product to be made, cost, the type of fillers (if any) used in the matrix, and the like. In a non-limiting example, the thickness of the film ranges from about 1 μm to about 1 mm. In another non-limiting example, the thickness of the film ranges from about 10 μm to about 250 μm. As used herein, a "substantially continuous film" refers to a layer of the composite material 114 that is molecularly continuous when laminated (or otherwise adhered) to the member 112, regardless of the amount of the surface area of the member 112 that the composite 114 layer actually covers. In other words, such continuous films do not exhibit breaks, gaps, or other spaces visually noticeable by a human eye.

The matrix may be any polymer, or sol-gel composition, or combination of polymer layer(s) on a sol-gel composition. Non-limiting examples of the polymer matrix include polycarbonates, epoxies, poly(acrylonitrile)s, transparent polyesters (such as poly(ethylene terephthalate or poly(butylene terephthalate), poly(acrylonitrile), poly(methylmethacrylate)s, and/or the like, and/or combinations thereof. In some instances, polyvinyl butyrals, polyurethanes, or polyvinyl chlorides may be used. The sol-gel compositions may be made by a sol-gel process, which is a wet-chemical method for making materials (typically a metal oxide) beginning from a chemical solution which reacts to bring forth nano-sized colloidal particles (or sol). Non-limiting examples of precursors in a sol-gel composition are metal alkoxides and metal chlorides. These precursors undergo hydrolysis and polycondensation reactions, thus forming a colloid or gel which can be dried to form an essentially solid gel material. The resulting compositions have solid particles (with size ranging from 1 nm to 1 μm) dispersed in a solvent. It is to be understood that when a sol-gel composition is used, the solid particles do not deleteriously affect the desired transmissivity of the composite 114.

The matrix of the composite 114 has graphene dispersed therein. In this embodiment, since the composite 114 is in direct physical contact with the electrical strips 116, the amount of graphene incorporated is below the percolation threshold for electrical conduction. In one embodiment, the percolation threshold for graphene is about 0.1 weight % of the total composite 114 weight %. As such, in some instances, graphene present in amounts at or below this threshold is not electrically conductive, but is thermally conductive. It is to be understood that this amount of graphene also maintains the transparency of the composite 114.

It is to be understood that the threshold value may change depending upon the processing route used. For example, if a reduction-extractive dispersion method is utilized to process the graphene, the percolation threshold is at about 0.15%; if ultrasonication of expanded graphite is accomplished in a liquid medium, followed by liquid mixing with a polymer or in situ polymerization, the percolation threshold is at about 0.31%; if graphene sheets are incorporated into polycarbonate by melt blending, using a microcompounder and a small scale, conical, twin screw extruder with a recirculation channel, the percolation threshold ranges from 0.008 to 0.011 volume fraction.

"Optical transparency", as the term is used herein to describe embodiments of the member 112 and the composite 114 of the structure 110, means the light transmittance of the corresponding structure is not below 0.75, with 1.0 being no interference with light transmittance. It is to be understood that the desired level of transparency of one structure 110 (e.g., a rear windshield) may be different from the desired level of transparency of another structure 110 (e.g., a front windshield).

It is to be understood that the graphene used in the embodiments of the composite disclosed herein may be produced via any suitable method or may be commercially obtained.

As shown in FIG. 2, the structure 110 may also include an outer coating 120 (e.g., a protective coating, an impact resistant coating, etc.) established on the composite 114. This portion of the structure 110 is exposed to the same elements to which the exterior of the vehicle 100 (or other component in which the structure 110 is included) is exposed. A protective coating 120 may be particularly desirable when the graphene composite 114 is established on a glass member 112. Silica, alumina or zirconia films may be deposited as a protective coating 120 on sol-gel based composites 114, while silica and zirconia film may be used as a protective coating 120 on polymer based composites 114. In an embodiment, the protective coating 120 thickness ranges from about 100 nm to about 10 μm. Suitable deposition techniques for establishing the protective coating 120 include pulsed laser deposition, metal organic chemical vapor deposition (MOCVD), RF sputtering, and sol-gel coating techniques.

Figure 3:
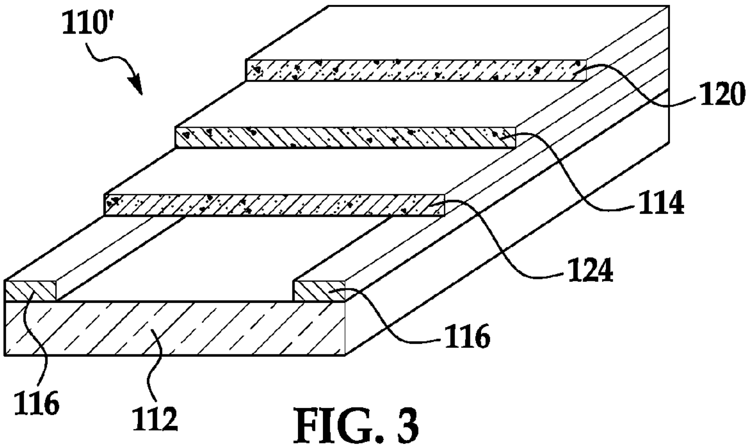
FIG. 3 is a schematic, perspective view of another example of a defrosting, defogging, and/or de-icing structure, having a portion of certain layers removed for clarity.

Referring now to FIG. 3, another embodiment of the structure 110' is depicted. In this embodiment, the composite 114 includes more than 0.1 weight % of the graphene in the matrix. The upper limit of the amount of graphene in this embodiment is limited, at least in part, on the desire to maintain the transparency of the optically transparent composite 114. It is to be understood that too much graphene will start to impede the transparency, thereby potentially inhibiting desirable visibility through the structure 110'. In one embodiment, the maximum loading of graphene in the matrix is up to 10 weight %, or in some instances up to 20 weight %. In a non-limiting example, amount of graphene included in the composite 114 ranges from about 0.05 weight % to about 1 weight %.

Since larger graphene loading enables the graphene to exhibit electrical conductivity, this embodiment of the structure 110' further includes an electrical insulation layer 124 established between the electrical strips 116 and the composite 114. This layer 124 prohibits the electrical current delivered to the electrical strips 116 from conducting through to the composite 114. However, it is to be understood that the heat generated from the electric current is conducted through the layer 124, and thus effectively heats the composite 114, including the graphene therein. As such, the electrical insulation layer 124 is electrically insulating while being thermally conductive. The thickness of the electrical insulation layer 124 may be any desirable thickness as long as the insulating/conducting properties are obtained. In one example, the electrical insulation layer 124 thickness ranges from about 50 nm to about 10 μm.

Non-limiting examples of suitable materials for the electrical insulation layer 124 include silica, alumina, zirconia, magnesia, or other like films. Suitable deposition techniques for establishing the electrical insulation layer 124 include chemical or physical vapor deposition techniques, and sol-gel coating techniques.

Figure 4:
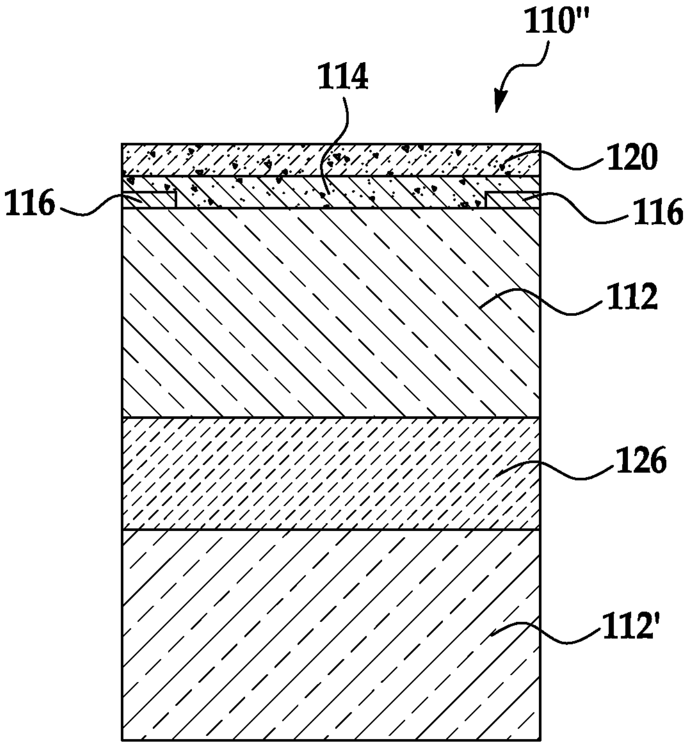
FIG. 4 is a cross-sectional view of still another example of a defrosting, defogging, and/or de-icing structure.
Figure 5:
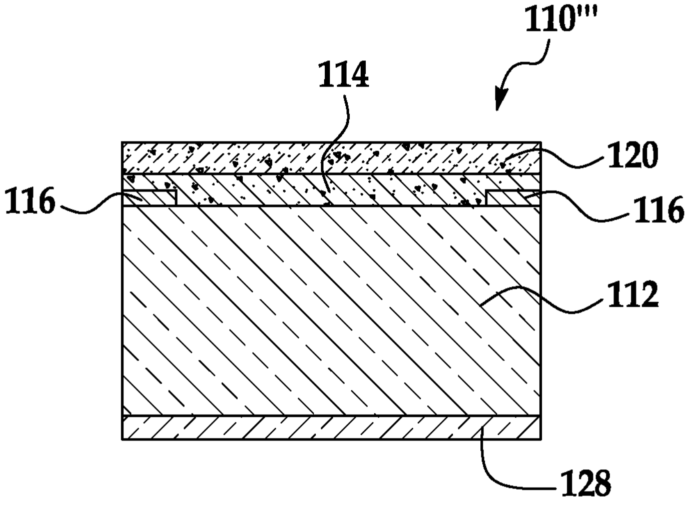
FIG. 5 is a cross-sectional view of yet another example of a defrosting, defogging, and/or de-icing structure.

Still other embodiments of the structure 110", 110''' are shown in FIGS. 4 and 5. Both of these examples include the embodiment of the structure 110 as shown in FIG. 2, namely that the graphene is low enough (i.e., equal to or less than 0.1 weight %) to eliminate the electrical conductivity, and thus electrically insulating layer 124 is not included. It is to be understood that the graphene content may be increased, and the electrically insulating layer 124 may be included. The examples shown in FIGS. 4 and 5 also include additional layers or components that may be included in the base structures 110, 110'.

In FIG. 4, the structure 110" includes a functional coating 126 and a second optically transparent member 112'. Each of these additional components is attached (either directly or indirectly) to the surface of the member 112 that is opposed to the surface upon which the composite 114 is established. When it is desirable to include two panes of the optically transparent member 112, 112', an optically transparent adhesive may be used as the functional coating 126 to adhere the members 112, 112' together.

In FIG. 5, the structure 110''' includes a reflective coating 128 on the surface of the member 112 that is opposed to the surface upon which the composite 114 is established. This embodiment may be desirable for a mirror.

Figure 6:
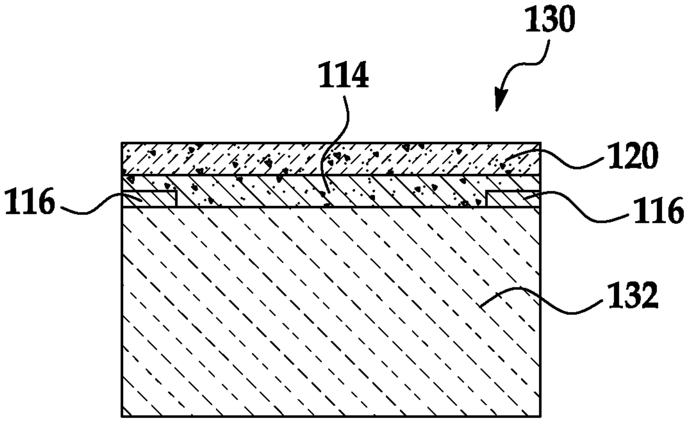
FIG. 6 is a cross-sectional view of another example of a defrosting, defogging, and/or de-icing structure.

Referring now to FIG. 6, another embodiment of a structure 130 is depicted. In this embodiment, an opaque member 132 is used instead of the optically transparent member 112. This structure 130 is particularly suitable for applications which do not require visibility through the structure 130 but where de-icing or defrosting is desirable. In one non-limiting example, the opaque member 132 is an airplane wing.

The example shown in FIG. 6 includes the composite 114 in direct contact with the electrical strips 116. As such, it is to be understood that the graphene amount in this example is at or below the percolation threshold. It is to be understood that if it is desirable to increase the graphene amount, the electrically insulating layer 124 may be included between the composite 114 and the electrical strips 116.

Referring now to FIGS. 7A, 7B, and 8A-8D, examples of the various electrical strip configurations are depicted. While numerous examples are illustrated, it is to be understood that such examples are non-limiting and that other configurations may be utilized. Very generally, a single electric strip 116 or multiple electric strips 116 may be positioned at the periphery and/or across a center portion of the structure 110.

The electrical heating strip(s) 116 may be a metal wire, a sintered body of metal adhered to the member 112 or composite 114, and a paste or ink including metal printed on the member 112 or composite 114. An example of suitable metal wires includes those made of copper, which has a positive temperature coefficient. Such a strip 116 can be formed from a sintered body of metal and adhered to the window glass.

Figure 7A:
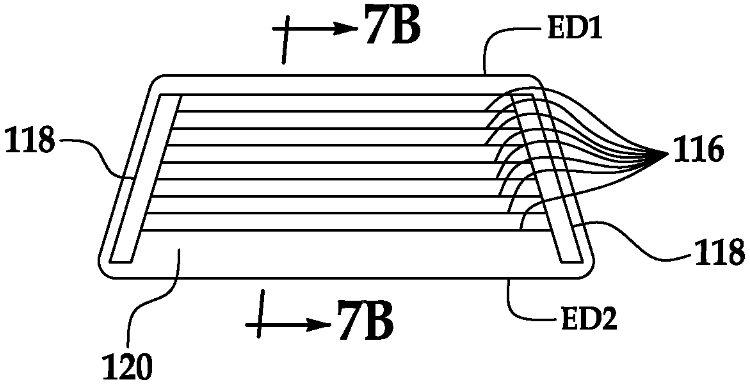
FIG. 7A is a schematic top view of an example of the embodiment of the structure as the rear window as shown in FIG. 1.
Figure 7B:
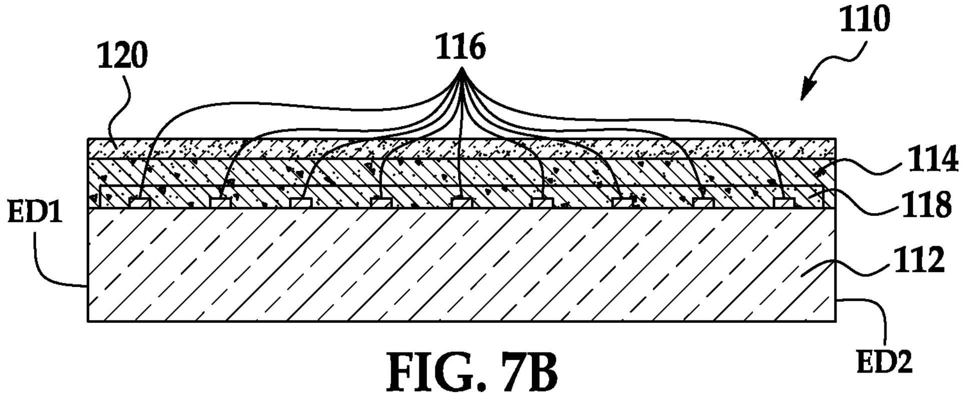
FIG. 7B is a cross-sectional view, taken along the 7B-7B line of FIG. 7A.

FIG. 7A illustrates the top view of the embodiment of the structure 110 shown in FIG. 1. As mentioned hereinabove, this embodiment includes two bus bars 118 configured to receive electrical current from a power supply (not shown), and to transmit such current to the electrical strips 116. The cross-sectional view, shown in FIG. 7B, illustrates the various components. As depicted, the electrical heating strips 116 are adhered to the optically transparent member 112 and are in contact with the optically transparent composite 114. The strips 116 are parallel to one another and extend substantially horizontally (with respect to edges ED1 and ED2) across at least a portion of the center portion of the member 112. The strips 116 are spaced apart at some predetermined distance from each other, and this distance is dependent upon, at least in part, the desire to enable visibility through the structure 110. In a non-limiting example, the strips 116 are spaced apart by 0.5 inches to 3 inches. It is to be understood that a substantially vertical (with respect to edges ED1 and ED2) orientation of the strips 116 may also be desirable in some embodiments.

As shown in FIG. 7B, the optically transparent composite 114 is deposited directly on the electrical strips 116 such that the strips 116 are embedded in the composite 114. The optically transparent composite 114 may be deposited via any suitable technique.

FIGS. 8A through 8D illustrate the electrical strip(s) 116 established directly on the member 112. This implies that the composite 114 will be established over the strip(s) 116, either with or without the electrically insulating layer 124 positioned therebetween. It is to be understood however, that any of the configurations shown may have the electrical strip(s) 116 positioned after the composite 114 is deposited or laminated to the member 112. In the latter instances, if the graphene content of the composite 114 is greater than 0.1 weight %, the electrically insulating layer 124 will be positioned on the composite 114 and beneath the strip(s).

Figure 8A:
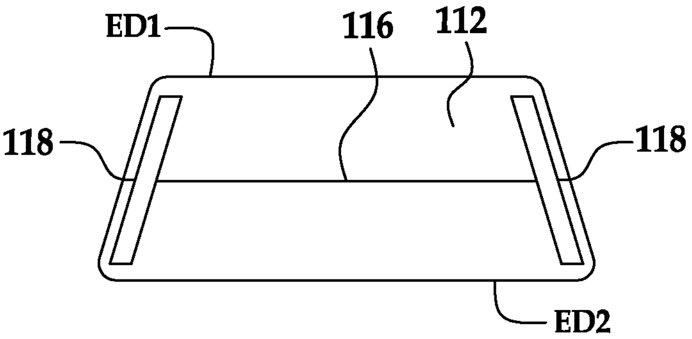
FIG. 8A is a schematic top view of an example of an optically transparent member including a single electrical strip established through a center portion thereof.

FIG. 8A illustrates one electrical strip 116 disposed between and electrically connected to two bus bars 118. The strip 116 is positioned across the center portion of the member 112 in the center between the two edges ED1, ED2.

Figure 8B:
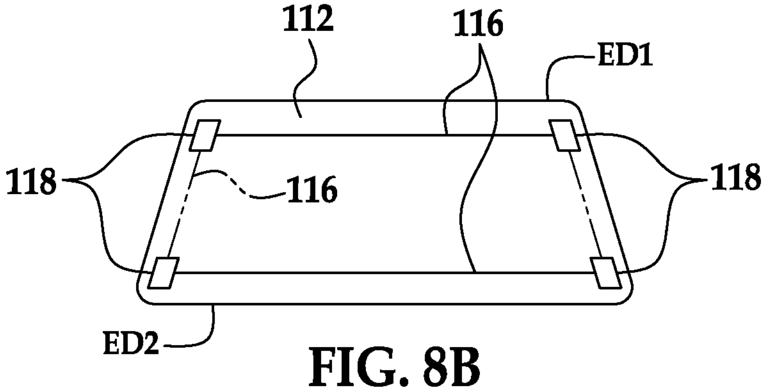
FIG. 8B is a schematic top view of an example of an optically transparent member including two electrical strips established at opposed ends of a periphery thereof.

FIG. 8B illustrates two electrical strips 116 disposed, respectively, along the top and bottom horizontal edges ED1, ED2 of the member 112. Each strip 116 extends between, and is operatively connected to two bus bars 118 situated at the top corners and the bottom corners of the member 112, respectively. Two additional electrical strips 116 are shown in phantom in FIG. 8B. This illustrates that the electrical strips 116 may be configured such that they extend along the periphery of the member 112. This particular embodiment may also be accomplished with a single electrical strip 116.

Figure 8C:
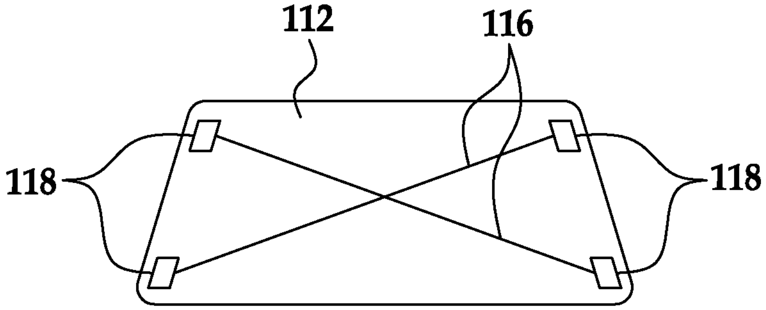
FIG. 8C is a schematic top view of an example of an optically transparent member including two electrical strips crossing each other through a center portion thereof.

FIG. 8C illustrates two electrical strips 116 disposed in a crisscross arrangement. The strips 116 are positioned diagonally across the center portion of the member 112, and are operatively connected to respective bus bars 118 for receiving electrical current therefrom. While two strips 116 are shown in this example, it is to be understood that multiple strips may be used in crisscross patterns.

Figure 8D:
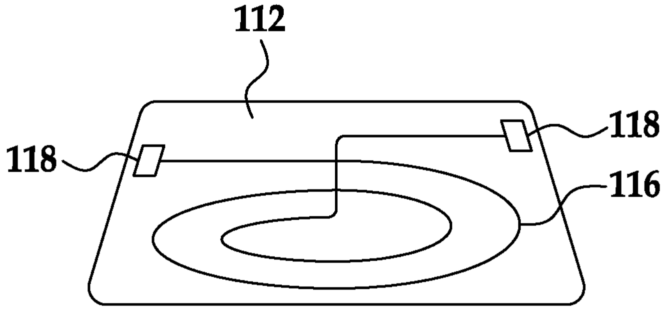
FIG. 8D is a schematic top view of an example of an optically transparent member including a single electrical strip in a spiral configuration.

FIG. 8D illustrates a single electrical strip 116 disposed in an expanding spiral configuration in the center portion of the member 112. In this embodiment, the electrical bus bars 118 are positioned so as to not impede visibility through the structure 110.

It is to be understood that any of the electrical strip 116 configurations discussed herein may be incorporated together in any desirable geometric configuration.

For any of the examples disclosed herein, the optically transparent composite 114 may be applied to the optically transparent member 112 via lamination. In lamination, the composite 114 is applied to the member 112 by i) applying a thin film of the composite 114 to the member 112, and ii) heating the composite 114 to form a bond with the member 112. In another non-limiting example, the composite 114 is applied to the member 112 by any conventional coating techniques, such as i) casting or spraying a solution including the composite 114 on the member 112, and ii) applying heat thereto to a) evaporate the solvent in the solution, b) cure the composite 114, and c) bond the composite 114 to the member 112. In some instances, pressure may be used in addition to the heat to improve bonding and/or sealing of the composite

114 and the member 112. In other instances, the components 112, 114 are sealed with a transparent adhesive. In instances where the member 112 includes a laminate (e.g., polyvinyl butyral), the laminate may also serve as a suitable adhesive. In another example, the member 112 may include a separate adhesive that does not impede or otherwise deleteriously affect the transparency of the overall structure 110, non-limiting examples of which include a thin layer of acrylate-based adhesive material, a thin layer of epoxy material, or combinations thereof. As previously mentioned, the electrical strips 116 may be applied before or after adherence of the components 112, 114 (or 132 and 114).

To further illustrate embodiment(s) of the present disclosure, the following examples are given. It is to be understood that these examples are provided for illustrative purposes and are not to be construed as limiting the scope of embodiment(s) of the present disclosure.

Example 1

Figure 9A:
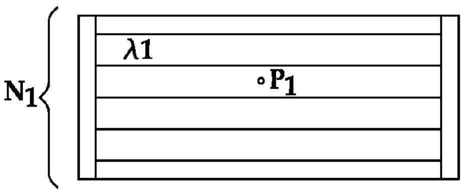
FIG. 9A is a schematic top view of a comparative structure including a thin polymer film without graphene therein, and a plurality of electrical strips.
Figure 9B:
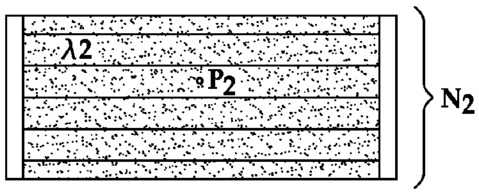
FIG. 9B is a schematic top view of an example of the structure with a thin polymer film with graphene therein, and a plurality of electrical strips.

Computer simulated calculations were performed for two rear vehicle windows having an optically transparent composite established thereon. Each window employs a pair of bus bars along the shorter edges of the window glass in a conventional heating strip arrangement (such as that described in Nakashima et al., U.S. Pat. No. 6,137,085). Schematic drawings of the two windows are shown in FIGS. 9A and 9B, respectively. In FIG. 9A, the optically transparent composite does not include graphene (i.e., this is the comparative example). In FIG. 9B, from about 0.1 weight % to about 0.2 weight % of graphene (as illustrated by the speckles) is included in the optically transparent composite (i.e., embodiment of the present disclosure example). As portrayed in the FIGS. 9A and 9B, $\lambda$1 and $\lambda$2 represent the respective heat conductivity values for the windows. N1 and N2 represent the number of electrical strips 116 on the comparative window and example window, respectively. P1 and P2 represent points at approximately the same location in the two windows. In this simulation, when N2=N1, $\lambda$2>$\lambda$1. Thus, according to these computer simulated calculations, heat conductance is significantly faster when graphene is present in the optically transparent composite 114. Furthermore, it is believed that the time interval to de-ice at location P2 is less than the time interval to de-ice at location P1 (due to the distribution of graphene throughout the example composite and the enhanced thermal conductivity of the example composite). The time intervals are calculated when the heat is turned on. Generally, the deicing time interval is measured from the time heat is turned on until the time the surface temperature reaches zero degree centigrade or the melting point of ice.

Example 2

Computer simulated calculations were performed for a rear window having an optically transparent composite coating established thereon. The window had 10 lines of printed silver paste lines, which function as electrical strips. The length of each line is 1 meter. The width of each line is 0.5 mm. The gap between each of the lines is 2.54 cm. The voltage supplied to the electrical strips is 12 volts. The surface resistivity of the rear window is 5 mΩ/(i.e., quadrature). Total resistance is equal to surface resistivity×no. of squares which is equal $0.005\times1000/10^{0.5}$, which in turn is equal to 1 W. Power is equal to $V^2/R$, which, in this example, is equal to 144 watts. Power input per unit length per wire is equal to 144 watts/1 m/10 wires which is equal to 14.4 W/m/wire. Assuming a 1 mm wide conducting media composite, heat flux into the domain is 14.4 W/m/$10^{-3}$ m, which is equal to 14400 W/$m^2$. By symmetry, half of the heat flux goes upward and the other half goes downward. It is assumed for the purpose of these calculations that all of the heat is taken up by the conducting composite 114, and not by the structural elements or atmosphere. The amount of graphene included is determined by the amount of conductivity specified.

Figure 10:
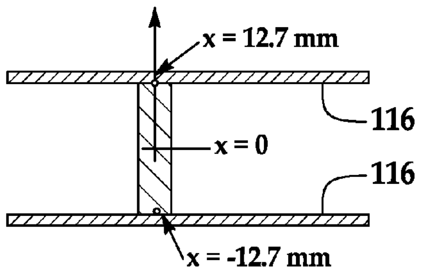
FIG. 10 is a schematic view of a portion of the structure.

FIG. 10 illustrates the dimensions of a small portion of two parallel heating strips 116 and the computational domain area between them in the rear window described in this example. With a 2.54 cm gap between the strips, in order to function effectively as a defogger/defroster, the heat from the heater wires in the strips 116 should be conducted so that half of the heat flux travels upward at least 12.7 mm and the other half of the heat flux travels downward at least 12.7 mm. If a point equidistant from the two strips is defined as 0, the points at the strip equal the distance from point 0 to the respective strip (i.e., 12.7 and −12.7, respectively). The inclusion of graphene in the composite between the strips will increase the thermal conduction of heat, thus enabling the structure to uniformly heat faster.

Example 3

Figure 11A:
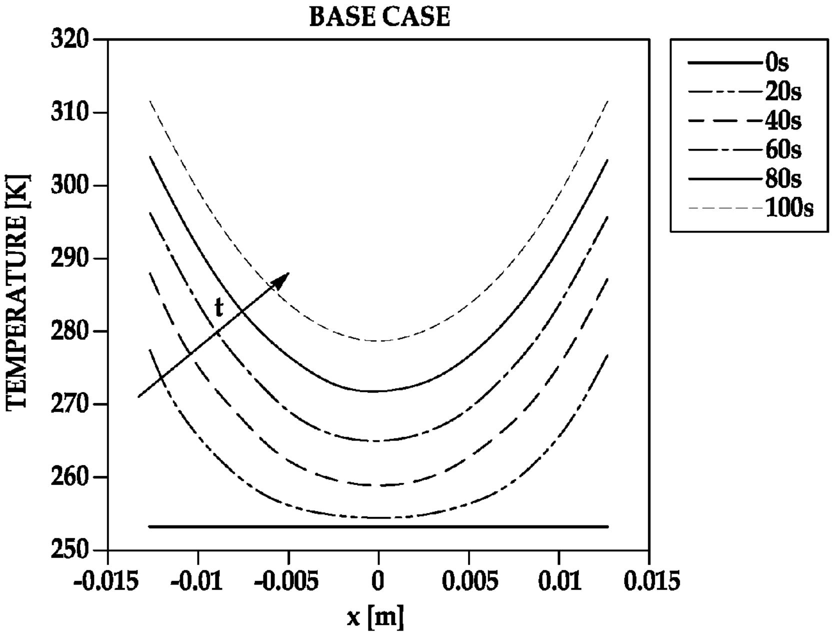
FIG. 11A is a graph plotting temperature at several times against measured heat flux.
Figure 11B:
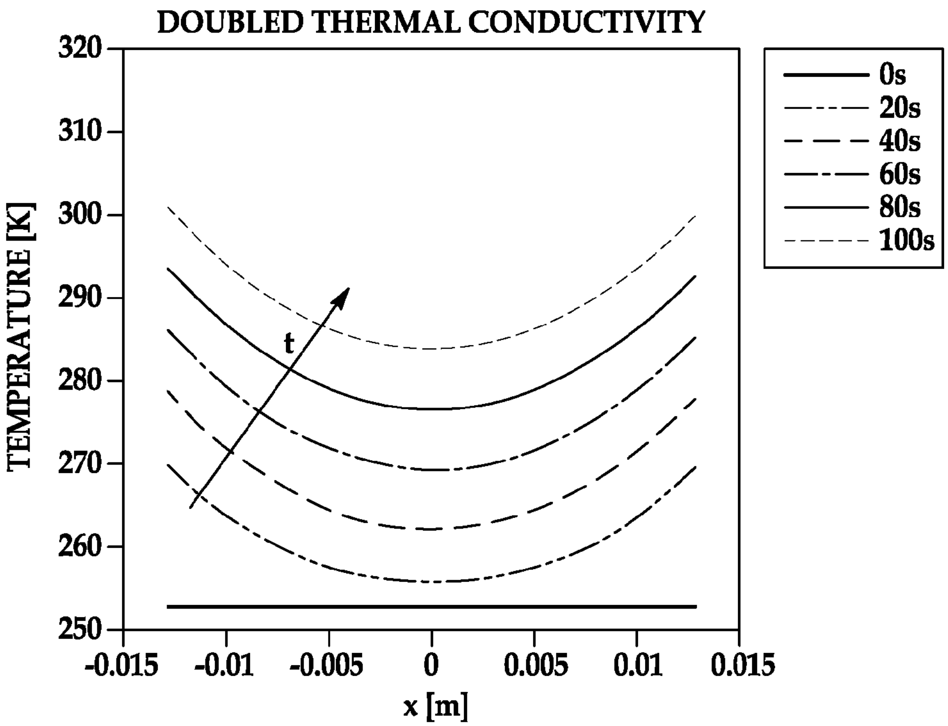
FIG. 11B is a graph plotting temperature at several times against measured heat flux.

Computer simulated calculations were performed for a rear vehicle window according to the materials and dimensions described in Example 2. Temperature profiles were calculated as shown in FIGS. 11A and 11B for a baseline case with normal conductivity (i.e., no graphene loaded into the matrix of the conducting composite) and a second case with doubled conductivity (i.e., which, according to an example of the instant disclosure is achieved with graphene in the matrix of the conducting composite 114), respectively. The temperature profiles are shown in these Figures for the specific times: 0 seconds, 20 seconds, 40 seconds, 60 seconds, 80 seconds, and 100 seconds. Points are plotted for temperature (K) vs.× (meters) (i.e., the distance up or down from the point equidistant between two parallel strips, x=0, as shown in FIG. 10). The arrows, t, in the graphs, FIGS. 11A and 11B, are the respective slopes which indicate the relative change in conductivity. Initial temperature for these calculations is −20° C. (253 K). The base case material was silica glass, having a thermal conductivity 1.38 W/m/K. Silica glass of the second example has the composite with graphene thereon, and the thermal conductivity (approximately 2.76 W/m/K) is doubled when compared to the base case. As the graphs in FIGS. 11A and 11B illustrate, increasing the thermal conductivity tends to homogenize the temperature within the domain. Hence, in comparing FIGS. 11A and 11B, at any given time, the temperature near the domain ends (i.e. x=12.7 mm and x=−12.7 mm) decreased, but the temperature at the center of the two strips (i.e., x=0) increased. Thus, enhanced thermal conductivity gives rise to more uniform defogging, defrosting and/or de-icing.

Example 4

Figure 12:
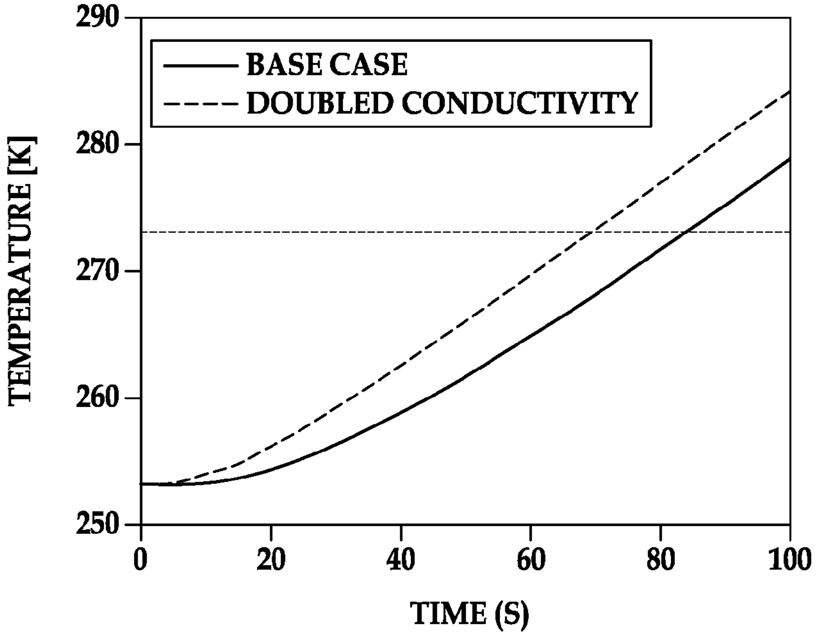
FIG. 12 is a graph plotting temperature against time for an example of the structure including silica glass as the optically transparent member.

Computer simulated calculations were performed for a rear vehicle window according to the materials and dimensions described in Example 2. De-icing time is defined as the time it takes for the temperature at the center of the domain (x=0) to reach 273.15 K for the first time, as shown in FIG. 12. For the base case, the de-icing time is calculated to be 84.3 seconds. In contrast, in the example having doubled conductivity, de-icing time was 69.6 seconds, a 17.4% reduction from the example when graphene is not included. The shorter deicing time results from the fact that, as thermal conductivity is enhanced, more uniform de-icing is achieved. This in turn leads to energy saving when heating the domain. Since the domain heats substantially uniformly and at a faster rate, the power needed to achieve heating may be less, and heat may be removed quicker.

While several examples have been described in detail, it will be apparent to those skilled in the art that the disclosed examples may be modified. Therefore, the foregoing description is to be considered exemplary rather than limiting.

The invention claimed is:

1. A defogging, defrosting, and de-icing structure, comprising:
- at least one optically transparent member;
- at least one electrical strip extending along at least one surface of the at least one optically transparent member;
- an optically transparent composite established on the at least one surface of the at least one optically transparent member such that the composite is in thermal communication with the at least one electrical strip, the composite including:
  - a matrix; and
  - a predetermined amount of graphene, the predetermined amount i) being greater than 0.1 weight % of a total weight % of the composite, and ii) being based upon a predetermined transparency for the defogging or defrosting structure and a predetermined thermal conductivity of the defogging or defrosting structure, and wherein the graphene functions as a thermal conductor, for substantially uniform heating of the composite; and
- a thermally conductive electrical insulation layer positioned between the at least one electrical strip and the composite, the thermally conductive electrical insulation layer prohibiting electric current to flow to the composite while allowing heat to flow to the composite.

2. The structure of claim 1 wherein the predetermined amount is less than about 10 weight % of the total weight % of the composite.

3. The structure of claim 1 wherein the composite is a substantially colorless, transparent film having a thickness ranging from about 1 μm to about 1 mm.

4. The structure of claim 1 wherein the at least one electrical strip is selected from the group consisting of a metal wire, a sintered body of metal adhered to the at least one optically transparent member, and a paste including metal printed on the at least one optically transparent member.

5. The structure of claim 1 wherein the at least one electrical strip is positioned as a single strip or as multiple strips on at least one of a periphery or a center portion of the optically transparent member.

6. The structure of claim 5 wherein the at least one electrical strip is positioned according to one of the following arrangements: a) the single strip positioned horizontally or vertically, with respect to an edge of the optically transparent member, across the center portion; b) a single strip positioned about the periphery; c) two strips positioned on opposed ends of the periphery; d) multiple parallel strips positioned across the center portion; e) multiple strips positioned across the center portion such that at least one strip crosses an other strip; f) at least one expanding spiral strip on the surface of the structure; or g) combinations thereof.

7. The structure of claim 1 wherein the matrix of the composite is selected from the group consisting of polymers, a sol-gel composition, and a combination of a sol-gel substrate and a polymer protective layer established thereon.

8. The structure of claim 7 wherein the polymers are selected from the group consisting of polycarbonates, epoxies, poly(acrylonitrile)s, polyvinyl butyrals, polyurethanes, polyvinyl chlorides, poly(methylmethacrylate)s.

9. The structure of claim 7 wherein the sol-gel composition has precursors selected from the group consisting of metal alkoxides and metal chlorides, the precursors having been submitted to at least one of a hydrolysis and a polycondensation reaction.

10. The structure of claim 1, further comprising electrical leads operatively connecting an electrical source to the at least one electrical strip.

11. The structure of claim 1 wherein the at least one optically transparent member is selected from a window, windshield, headlight, backlight, and combinations thereof, and wherein the defogging or defrosting structure is used in at least one of automobiles, trucks, motorcycles, buses, motor homes, planes, helicopters, boats, trains, or buildings.

12. A method of defrosting, defogging, or de-icing using the structure of claim 1, the method comprising:
- selectively transmitting electrical current to the at least one electrical strip to generate heat that is conducted through the thermally conductive electrical insulation layer and the composite, thereby substantially uniformly heating the composite via thermal conductivity to raise a surface temperature of the defogging, defrosting, and de-icing structure, wherein the substantially uniform heating reduces a time for defrosting, defogging, or de-icing.

13. The defogging, defrosting, and de-icing structure as defined in claim 1 wherein the predetermined amount is less than about 20 weight % of the total weight % of the composite.

14. A vehicle structure capable of defrosting, defogging, and de-icing, the structure comprising:
- an optically transparent member selected from a window, windshield, headlight, or backlight;
- a plurality of electrical strips positioned as a single strip or as multiple strips on at least one of a periphery or a center portion of the optically transparent member;
- an optically transparent composite established on the at least one surface of the at least one optically transparent member such that the composite is in thermal communication with the at least one electrical strip, the composite including:
  - a matrix; and
  - graphene in an amount ranging from greater than 0.1 weight % to equal to or less than 10 weight % of a total weight of the composite, wherein the structure is configured such that the graphene functions as a thermal conductor, for substantially uniform heating of the composite; and
- a thermally conductive electrical insulation layer positioned between the plurality of electrical strips and the composite, the thermally conductive electrical insulation layer prohibiting electric current to flow to the composite while allowing heat to flow to the composite.

15. The vehicle structure as defined in claim 14 wherein the optically transparent member is glass, and wherein the structure further comprises an optically transparent protective coating established on the optically transparent composite.

* * * * *